United States Patent
Inoue et al.

(10) Patent No.: US 7,277,362 B2
(45) Date of Patent: Oct. 2, 2007

(54) AUDIO SIGNAL REPRODUCTION APPARATUS HAVING SCRATCH REPRODUCING FUNCTION

(75) Inventors: Hideo Inoue, Mitaka (JP); Kenji Oniki, Musashino (JP); Tomohiko Kikuchi, Musashimurayama (JP)

(73) Assignee: TEAC Corporation (JP)

( * ) Notice: Subject to any disclaimer, the term of this patent is extended or adjusted under 35 U.S.C. 154(b) by 518 days.

(21) Appl. No.: 10/808,870

(22) Filed: Mar. 25, 2004

(65) Prior Publication Data

US 2004/0190409 A1    Sep. 30, 2004

(30) Foreign Application Priority Data

Mar. 25, 2003    (JP)    ............................. 2003-082001

(51) Int. Cl.
*H04B 1/20*    (2006.01)
(52) U.S. Cl. ......................................................... 369/4
(58) Field of Classification Search .................... 369/2, 369/4; 381/119
See application file for complete search history.

(56) References Cited

U.S. PATENT DOCUMENTS

| | | | | |
|---|---|---|---|---|
| 5,763,874 | A * | 6/1998 | Luciano et al. ........ | 250/231.14 |
| 6,535,462 | B1 * | 3/2003 | Liu ............... | 369/4 |
| 6,751,167 | B2 | 6/2004 | Yamada et al. | |
| 7,072,249 | B2 * | 7/2006 | Huang ........... | 369/4 |
| 2001/0011497 | A1 * | 8/2001 | Yamada et al. ........... | 84/602 |
| 2001/0017832 | A1 * | 8/2001 | Inoue et al. ........... | 369/53.34 |
| 2003/0063066 | A1 * | 4/2003 | Thomas Brown ........... | 345/156 |
| 2005/0052981 | A1 * | 3/2005 | Shim et al. ............ | 369/59.26 |
| 2005/0259532 | A1 * | 11/2005 | Roman et al. ............. | 369/47.1 |
| 2006/0039245 | A1 * | 2/2006 | Huang ........................ | 369/18 |

FOREIGN PATENT DOCUMENTS

| | | |
|---|---|---|
| JP | 2000-047665 | 2/2000 |
| JP | 2000-182318 | 6/2000 |
| JP | 2000-316194 A | 11/2000 |
| JP | 2001-272977 | 10/2001 |
| JP | 2001-212857 | 11/2001 |
| JP | 2001-312857 | 11/2001 |
| JP | 2002-252513 A | 6/2002 |

* cited by examiner

*Primary Examiner*—William Korzuch
*Assistant Examiner*—Nathan Danielsen
(74) *Attorney, Agent, or Firm*—Anderson Kill & Olick, PC

(57) ABSTRACT

An audio signal reproduction apparatus for reproducing scratch sound from an optical disk. Scratch reproduction operation is performed through use of a jog dial and a turntable. When either the jog dial or the turn table has been actuated, a rotational operation signal of the thus-actuated element is supplied to a main system controller of the apparatus. The main system controller detects a rotational direction and a rotational speed, which have been achieved at the time of scratching operation, on the basis of the rotational operation signal, thereby controlling reading of audio data from memory. The main system controller processes the rotational operation signal in accordance with a jog dial/turntable switching signal, thereby controlling reading of audio data such that the same scratching sound is output when the same rotational operation has been performed.

14 Claims, 6 Drawing Sheets

AUDIO SIGNAL REPRODUCTION APPARATUS HAVING SCRATCH REPRODUCING FUNCTION

BACKGROUND OF THE INVENTION

1. Field of the Invention

The present invention relates to an audio signal reproduction apparatus, and more particularly, to scratch playback of a recording medium on which an audio signal is recorded.

2. Related Art

There has already been known scratch playback for generating a unique rhythm by means of consecutively rotating an analog record disk at high or low speed in a forward or backward direction on an analog record player or the like. There has also been put forth a technique capable of effecting scratch playback of an optical disk such as a CD.

JP-A-2001-312857 discloses a device equipped with a jog dial for effecting scratching operation, wherein the rotational direction and speed of the jog dial are detected, and an audio signal—which has been played and stored in memory beforehand—is read and played back in accordance with the detected rotational direction and speed, thereby effecting scratch play.

Specific scratch playback is performed in the following manner. Specifically, an optical disk is reproduced at a speed double (a double speed) an ordinary reproduction speed (a constant speed) by means of an apparatus for reproducing an optical disk, such as a CD, and the thus-reproduced audio data are stored in memory such as DRAM. The memory stores audio data corresponding to, e.g., about ten seconds. When a jog dial has been actuated, the data stored in the memory are read and reproduced in accordance with the rotational direction and speed of the jog dial. The data that have been stored in the memory and correspond to about 10 seconds are taken as five seconds of preceding audio data and five seconds of subsequent audio data. When the jog dial has been actuated in a forward direction (e.g., a clockwise direction), data—which are chronologically subsequent to the present time by the amount of data corresponding to a rotational angle of actuation of the jog dial—are read and reproduced at a speed corresponding to the rotational speed of the jog dial. In contrast, when the jog dial has been actuated in a rearward direction (e.g., a counterclockwise direction), data—which chronologically precede the present time by the amount of data corresponding to the rotational angle of actuation of the jog dial—are read and reproduced at a speed corresponding to the rotational speed of the jog dial.

As mentioned above, the user can output scratch sound even in the case of an optical disk by means of actuating the jog dial. There is also a case where the user desires to output scratch sound by means of actuating a turntable of a conventional analog player. Particularly, the user, such as a disk jockey (DJ) who is proficient in operation for scratching an analog player, may sometimes experience an unusual feeling in producing scratch sound through actuation of the jog dial.

Therefore, in addition to having the jog dial, preferably the apparatus is also equipped with a turntable and supplies a turntable rotary operation signal, thereby enabling output of scratch sound through actuation of the turntable as in the case of the jog dial. As a result, the user can arbitrary select whether to output scratch sound by means of actuation of the jog dial or by means of a turntable whose operation is acclimatized. Thus, a great improvement in operability of the reproduction apparatus is expected.

However, in a case where the jog dial and the turntable coexist and scratch sound is output by means of scratching operation of one of them, the jog dial and the turntable usually differ in size from each other. When scratching operation is detected by a sensor, a difference exists in operation detected signals. Even when the user has performed the same scratching operation, there may be a case where the scratch sound output by means of the jog dial may differ from that output by means of the turntable. Thus, the user's operability is deteriorated. Particularly, the DJ versed in actuation of the turntable encounters difficulty in outputting, through actuation of the jog dial, scratch sound identical with that which would be output through actuation of the turntable. Therefore, the reason for coexistence of the jog dial and the turntable is diminished.

SUMMARY OF THE INVENTION

The present invention provides an audio signal reproduction apparatus which has a plurality of types of scratching operation means, such as a jog dial and a turntable; which outputs the same scratching sound when the same scratching operation has been performed; and which has superior operability.

The audio signal reproduction apparatus comprises scratching operation means; rotational speed detection means which detects at least a rotational speed of the scratching operation means and outputs the rotational speed as a rotational speed signal; and processing means for reproducing audio data which have been read from an audio signal recording medium beforehand and stored in accordance with the rotational speed signal. The scratching means has first operation means, and second operation means differing from the first operation means. The rotational speed of the first operation means and that of the second operation means, both being achieved at the same rotational speed, differ from each other. The apparatus further comprises detection means for detecting which of the first and second operation means has been actuated. The processing means reproduces scratch sound from the audio data in accordance with a rotational speed signal output from the rotational speed detection means through use of a reference rotational speed signal corresponding to the operation means detected by the detection means from among a predetermined rotational speed signal of the first operation means and a predetermined rotational speed signal of the second operation means, both being achieved at the reference rotational speed.

The audio signal reproduction apparatus of the present invention comprises rotational operation means; and processing means which reproduces an audio signal recorded on an optical disk in accordance with at least a rotational signal representing an operation speed of the rotational operation means and outputs the audio signal as scratch sound. The rotational operation means includes first and second rotational operation means. The processing means has conversion means which converts at least either a rotational signal output from the first rotational means or a rotational signal output from the second rotational operation means such that the same rotational signal is achieved when the first and second rotational operation means are rotated at the same rotational speed.

The invention will be more clearly comprehended by reference to the embodiments provided below. However, the scope of the invention is not limited to these embodiments.

DESCRIPTION OF THE PREFERRED EMBODIMENT

An embodiment of the present invention will be described hereinbelow by reference to the drawings.

Figure 1:
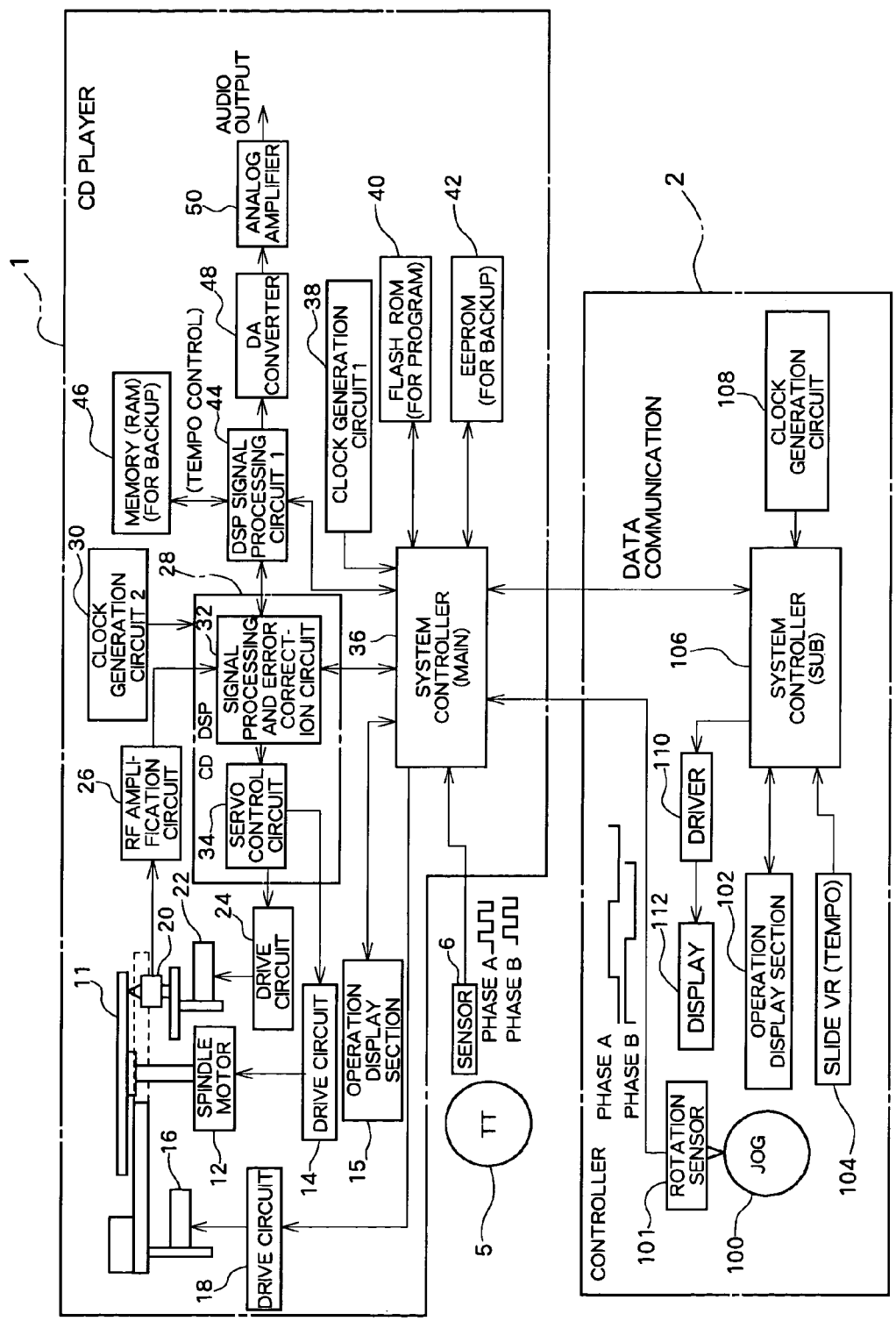
FIG. 1 is a block diagram of the entirety of an audio signal reproduction apparatus according to an embodiment of the present invention.

FIG. 1 is a block diagram of the entirety of an audio signal reproduction apparatus according to an embodiment of the present invention. The audio signal reproduction apparatus comprises a CD player 1, a controller 2, and a turntable (TT) 5.

The CD player 1 reproduces a CD 11 serving as an optical disk. After having been placed on a tray and transported to a loading position, the CD 11 is clamped and rotationally driven by a spindle motor 12. The rotational speed of the spindle motor 12 is controlled by a drive circuit 14, and the drive circuit 14 rotationally drives the spindle motor 12 by means of a control signal output from a DSP 28. Specifically, the spindle motor 12 rotationally drives the CD 11 at double speed in accordance with a command from the DSP 28 and the drive circuit 14. The tray on which the CD 11 is to be placed is driven by a tray motor 16 so as to load and unload. The tray motor 16 is driven by a drive circuit 18.

An optical pickup 20 is disposed opposite the CD 11. The optical pickup 20 radiates a reproduction laser beam onto the CD 11 and receives the light reflected from the CD 11, thereby reading audio data from the CD 11. The optical pickup 20 is driven in the radial direction of the CD 11 by means of a thread motor 22, and driving of the thread motor 22 is controlled by a drive circuit 24. The drive circuit 24 is controlled by a control signal output from the DSP 28. A reproduction signal output from the optical pickup 20 is supplied to an RF amplification circuit 26, and the RF amplification circuit 26 supplies a reproduced RF signal to the DSP 28.

The DSP 28 includes a signal processing and error correction circuit 32 and a servo control circuit 34. The signal processing and error correction circuit 32 processes the reproduced RF signal output from the RF amplification circuit 26, to thus demodulate audio data, and supplies the thus-demodulated audio data to a DSP signal processing section 44 while correcting errors in the audio data. The DSP signal processing section 44 stores the audio data output from the DSP 28 into memory 46. The memory 46 is constituted of DRAM or the like and acts as a buffer for audio data. During scratching operation, the DSP signal processing section 44 stores, into the memory 46, audio data corresponding to a total of 10 seconds and consisting of audio data extending five seconds in the past and audio data extending five seconds in future with reference to the present time. The audio data stored in the memory 46 are read by the DSP signal processing section 44 and output as an audio signal from an analog amplifier 50 after having been converted into an analog audio output by a digital-to-analog (DA) converter 48. A rate at which the DSP signal processing section 44 reads audio data from the memory 46 is set in accordance with tempo (Tempo) control. Here, tempo control specifies the tempo of scratch sound and is determined in accordance with a rotational operation speed achieved through scratching operation. Specifically, when scratching operation is performed at double speed; i.e., at double the rotational operation speed, the DSP signal processing section 44 reads audio data from the memory 46 at a processing speed which is double ordinary processing speed and outputs the thus-read audio data to the DA converter 48. Similarly, when the scratching operation is performed at one-half speed; i.e., at one-half of rotational operation speed, audio data are read from the memory 46 at one-half processing speed. The rate at which the audio data are read from the memory 46 in the DSP signal processing section 44; that is, tempo control, is controlled in accordance with a command from a main system controller 36.

The signal processing and error correction circuit 32 of the DSP 28 supplies the servo control circuit 34 with a servo signal to be used for driving the thread motor 20 in accordance with a command from the system controller 36 or driving the spindle motor 12. The servo signal is output when the optical pickup 20 is caused to perform seeking operation in the radial direction of the CD 11, to thereby enable reading of data from a desired track position. The servo control circuit 34 controls the drive circuit 24 in accordance with the servo signal to drive the thread motor 22, or controls the drive circuit 14 to drive the spindle motor 12. The DSP 28 operates in accordance with a clock signal output from a clock generation circuit 30.

The main system controller 36 controls the overall operation of the CD player 1. The main system controller 36 receives an operation signal output from an operation display section 15 provided in the CD player 1 and outputs display data to the display section. Moreover, the main system controller 36 receives a rotational operation signal output from a jog dial (JOG) 100 provided in the controller 2 and instructs the DSP signal processing section 44 to read data from the memory 46 in accordance with the rotational operation signal. The main system controller 36 receives a rotational operation signal from the turntable (TT) 5 provided separately from the jog dial 100 and instructs the DSP signal processing section 44 to read data from the memory 46 in accordance with this rotational operation signal, as well.

The jog dial 100 and the turn table 5 are disjunctively selected. The selected signal or switching signal is supplied from sub system controller 106 provided in the controller 2 to the main system controller 36. A processing program and data, both belonging to the main system controller 36, are stored in flash ROM 40, and backup data are stored in EEPROM 42.

The controller 2 is connected to the CD player 1. The controller 2 and the CD player 1 may be connected together as a unit, disposed independently of each other, or incorporated into the audio signal reproduction apparatus. The controller 2 comprises the jog dial 100, an operation display section 102, a slide VR (tempo) 104, and the sub system controller 106.

The jog dial 100 is provided with a sensor 101 for detecting rotational operation of the jog dial 100, and rotational operation achieved at the time of actuation of the jog dial 100 is supplied to the main system controller 36 as a rotational operation signal. The sensor 101 is constituted of a rotary encoder equipped with a photo-interrupter and supplies to the main system controller 36 a pulse signal conforming to the rotational direction and rotational speed of the jog dial 100. The rotational direction is determined from a phase sequence of two signals which have phases A and B and are output from mutually-different positions of the jog dial 100 (i.e., positions which are 90° out of phase with each other). The rotational speed is determined from a pulse cycle of the pulse signal. FIG. 1 shows the pulse signals having phases A and B. Phase A lags 90° behind phase B. When the jog dial 100 is actuated in a forward direction, the pulse signals are output in sequence; that is, phase A and then phase B. In contrast, when the jog dial 100 is actuated in reverse, the pulse signals are output in reverse sequence; that is, phase B and then phase A. Thereby, the rotational direction of the jog dial is detected. Further, the rotational operation speed of the jog dial 100 is reflected on the pulse cycle of the pulse signal. The faster the rotational operation speed, the shorter the pulse cycle. In accordance with the pulse cycle of the pulse signal supplied from the sensor 101 of the jog dial 100, the main system controller 36 determines the tempo of scratch sound, thereby instructing the DSP signal processing section 44.

The turntable 5 disposed separately from the jog dial 100 is also provided with a sensor 6 which detects rotational operation of the turntable 5 and outputs the thus-detected rotational operation as a rotational operation signal. The turntable 5 is provided as a unit which is independent of the CD player 1 and the controller 2. The rotational operation signal pertaining to the turntable 5 is supplied to the main system controller 36 as in the case of the rotational operation signal output from the jog dial 100. The main system controller 36 detects the rotational direction and rotational speed of the turntable 5 in accordance with the rotational operation signal output from the sensor 6, determines the tempo of the scratch sound, and instructs the DSP signal processing section 44. On the basis of the switching signal output from the sub system controller 106, the main system controller 36 determines whether the input rotational operation signal is output from the jog dial 100 or from the turntable 5. Specifically, when the user has actuated the operation display section 102 to thus select the jog dial 100, the sub system controller 106 supplies, to the main system controller 36, a signal indicating that the actuation corresponds to scratching operation performed by way of the jog dial 100. When the user has selected the turntable 5, data to this effect are supplied to the main system controller 36. The sub system controller 106 operates in accordance with a clock signal output from a clock generation circuit 108.

Figure 2:
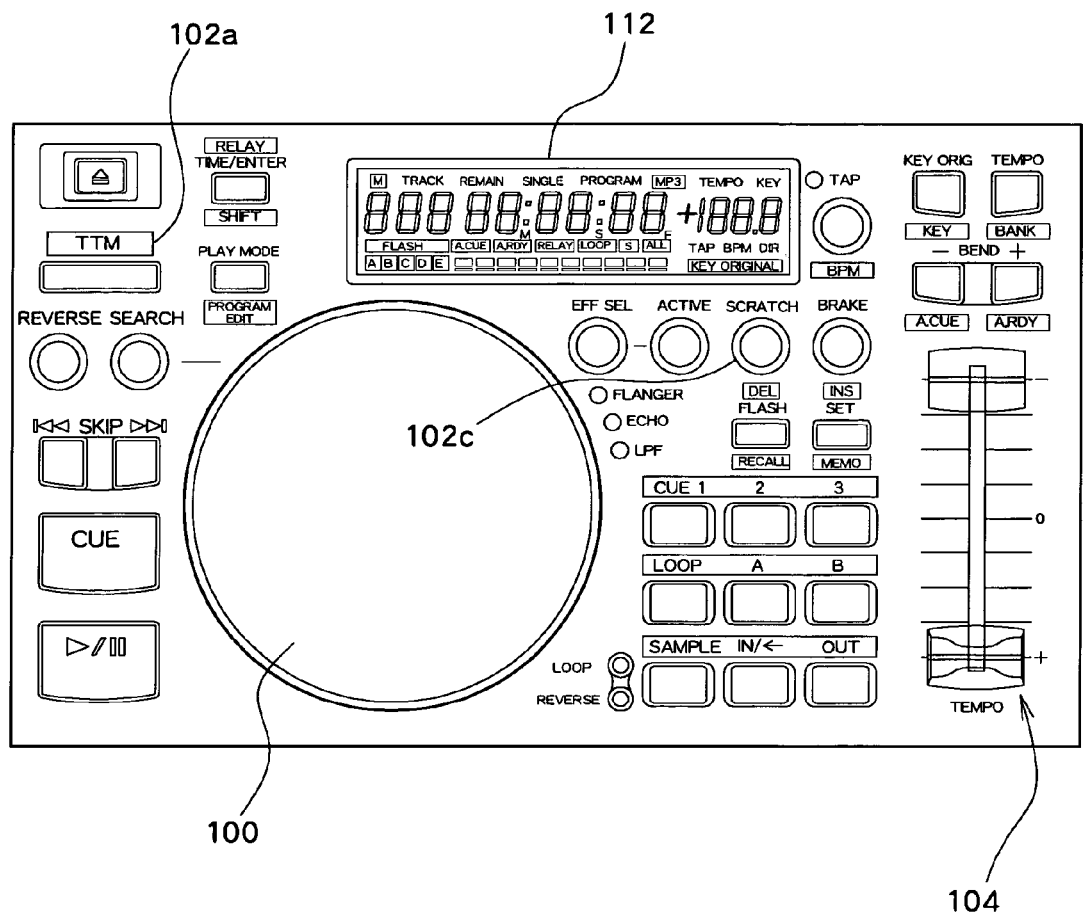
FIG. 2 is a descriptive view of a front panel of a controller shown in FIG. 1.

FIG. 2 shows a front view of the controller 2. The front panel of the controller 2 is provided with the jog dial 100, a changeover switch 102a to be used for switching the scratching operation to the turntable 5, a scratch key 102c, the slide VR (tempo) 104, and a display 112.

When performing scratching operation through use of the jog dial 100, the user first actuates the scratch key 102c and then rotates the jog dial 100. An operation signal pertaining to the scratch key 102c is supplied from the sub system controller 106 to the main system controller 36, and in accordance with the operation signal the main system controller 36 sets the DSP signal processing section 44 and the memory 46 in a scratchable state. Here, the scratchable state means that the reading position of the memory 46 is shifted to the center, thereby ensuring memory capacity for the preceding five seconds of audio data and the subsequent five seconds of audio data. When the jog dial 100 has been actuated, the sensor 101 of the jog dial 100 supplies a rotational operation signal to the main system controller 36. In accordance with a command from the main system controller 36, the DSP signal processing section 44 reads the amount of data corresponding to the rotational angle of the jog dial 100 at a processing speed corresponding to the rotational speed of the jog dial 100, thereby effecting scratch reproduction operation. In relation to the amount of data, when the rotational direction is forward, future data among the about 10 seconds of data stored in the memory 46 are read and reproduced by an amount corresponding to an address conforming to the rotational angle. When the jog dial is rotated in reverse, past data among the about 10 seconds of data stored in the memory 46 are read by an amount corresponding to an address conforming to the rotational angle and reproduced.

When the user has actuated the changeover switch 102a after having actuated the scratch key 102c, the main system controller 36 receives the rotational operation signal output from the sensor 6 of the turntable 5 and instructs the DSP signal processing section 44 in accordance with the rotational operation signal. The system controller 36 does not simply process the rotational operation signal output from the jog dial 100 or the turntable 5, to thereby instruct the DSP signal processing section 44 in reading speed, but performs processing operation by means of determining whether or not the currently-received rotational operation signal pertains to the jog dial 100 or the turntable 5. The reason for this is that the jog dial 100 differs in size from the turntable 5 and therefore different pulse signals are output from the rotary encoder even when the same rotational operation has been performed.

The sensor 6 provided on the turntable 5 (the same also essentially applies to the sensor 101) will be described herein below.

Figure 3A:
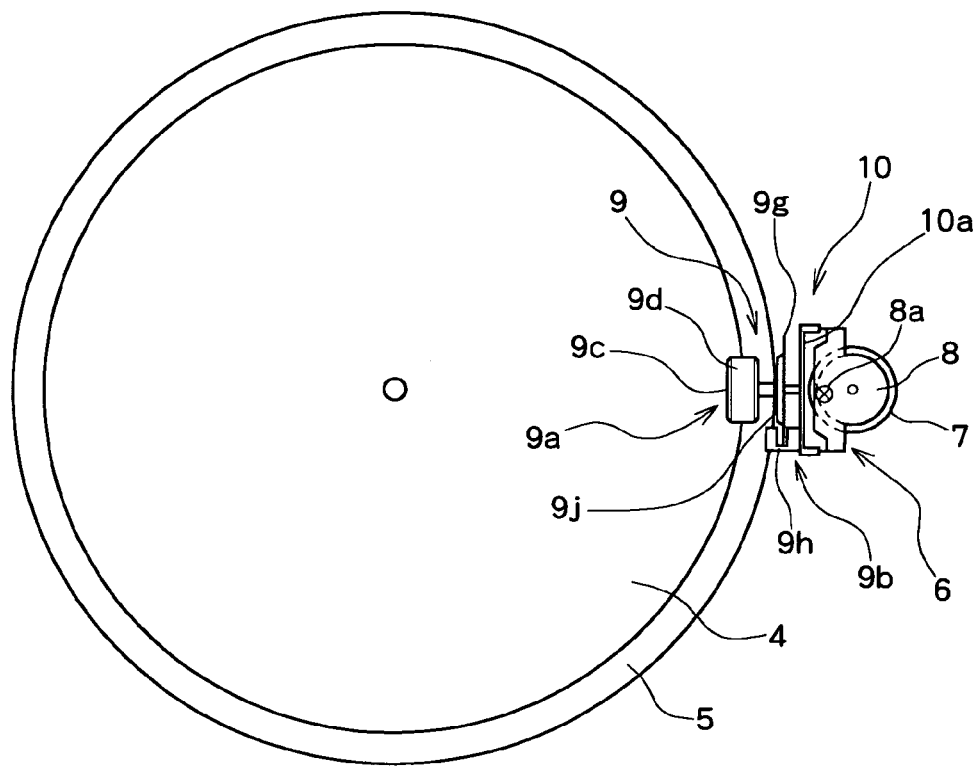
FIG. 3A is a plan view of a turntable and a sensor.
Figure 3B:
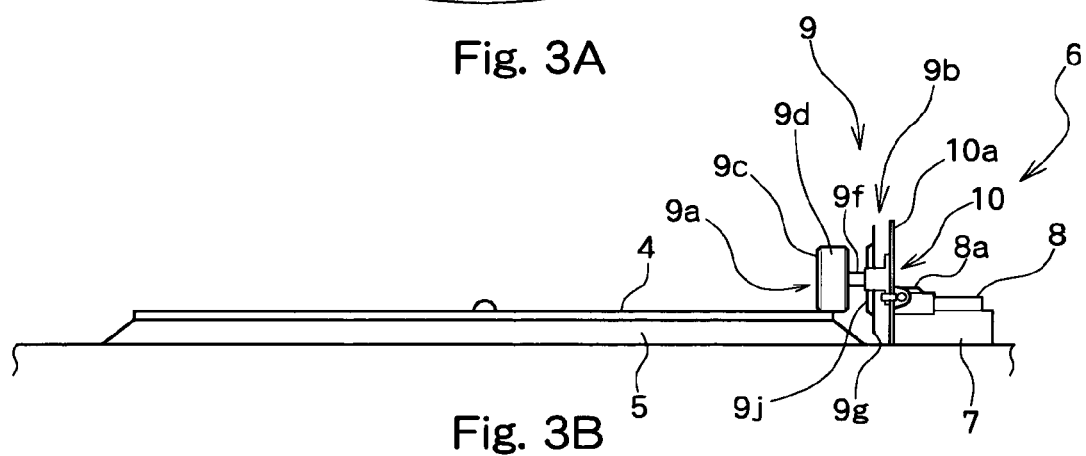
FIG. 3B is a side view of the turntable and the sensor.
Figure 4:
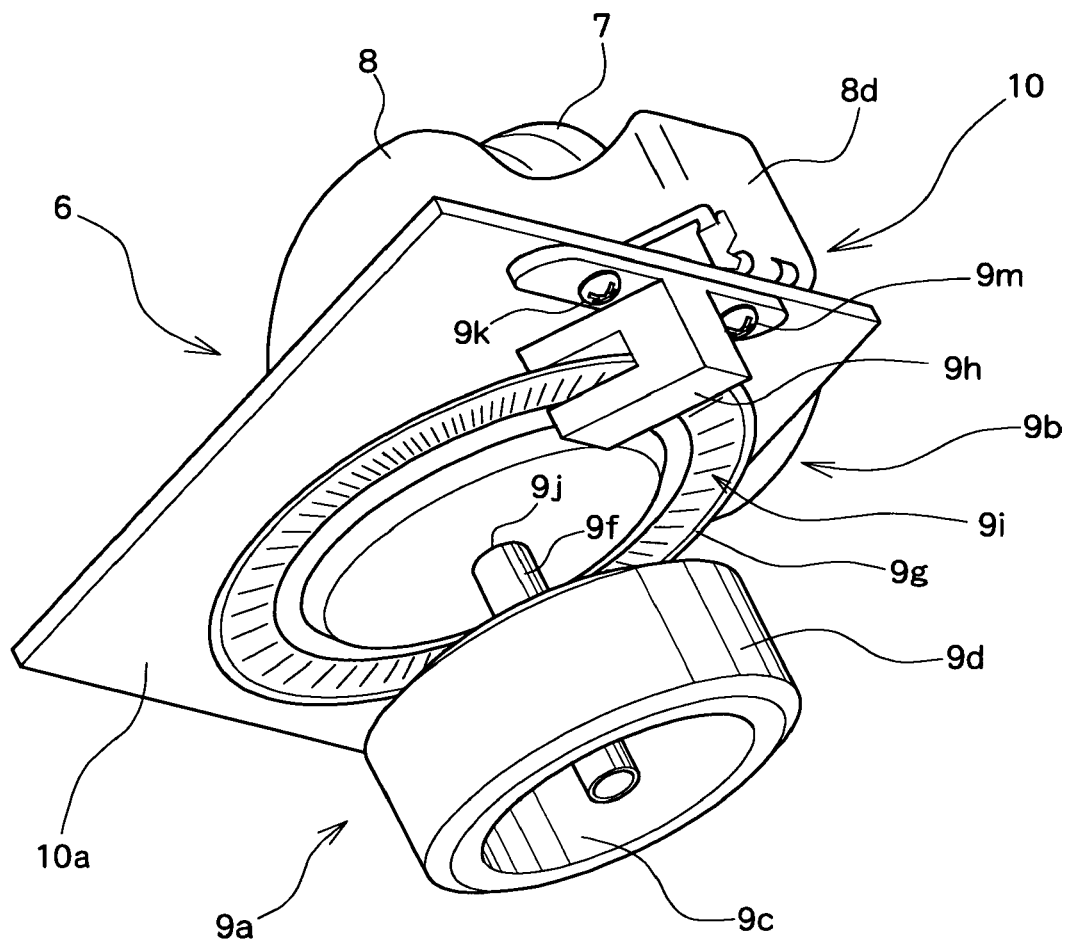
FIG. 4 is a perspective view of a sensor provided in the turntable.

FIG. 3A shows a plan view of the turntable 5, and FIG. 3B shows a front view of the same. Further, FIG. 4 shows a perspective view of the sensor 6. Here, the drawings show that an analog record disk 4 is loaded on the turntable 5. However, the analog record disk 4 is not indispensable.

The sensor 6 comprises a base 7; a chassis 8; a detection section 9; and a switching section 10. The base 7 is a member to be removably attached to the turntable 5 and is formed from a cylindrical metal member having a large mass. The detection section 9 comprises a rotor 9a and a rotary encoder 9b. The rotor 9a is a member to be brought into rotational contact with the analog record disk 4 and has a roller section 9c, a slip prevention member 9d, and a spindle section 9f. The roller section 9c is a cylindrical member formed from synthetic resin such as plastic. The slip prevention member 9d is an annular member made of rubber, or the like, for increasing frictional force which would arise between the slip prevention member 9d and a thick portion of an outer edge of the analog record disk 4 when the slip prevention member 9d comes into contact with the thick section. The slip prevention member 9d is attached to an outer peripheral surface of the roller section 9c. The rotary encoder 9b is a device for detecting the rotational direction and rotational speed of the rotor 9a and is made up of an encoder disk 9g and a photo-interrupter 9h. Formed on the encoder disk 9g are black stripes 9i printed on a disk-shaped polyester film in a circumferential direction thereof, and a fitting hole 9j into which the spindle section 9*f* is to fit. The encoder disk 9*g* is fixed to the spindle section 9*f* by means of an adhesive or the like so as to rotate integrally with the roller section 9*c*. The photo-interrupter 9*h* is a photo-electric conversion section for converting an optical signal into an electrical signal. The photo-interrupter 9*h* is fixed to a support member 10*a* by means of screws 9*k*, 9*m* such that the black stripes 9*i* of the encoder disk 9*g* pass between a light-emitting element and a light-receiving element. The photo-interrupter 9*h* generates the pulse signals of two phases (phase A and B) when the encoder disk 9*g* is spun. The switching section 10 is a device for switching the detection section 9 between a detection operation and a non-detection operation. When the turntable 5 is spun, the rotor 9*a* is rotated by means of the frictional force developing between the slip prevention member 9*d* and the analog record disk 4, whereupon the detection section 9 is switched from the non-detection operation to the detection operation. When the rotor 9*a* is spun, the rotary encoder 9*b* detects the rotational direction and rotational speed of the rotor 9*a* and outputs the thus-detected direction and speed as a pulse signal. When the analog record disk 4 is not placed on the turntable 5, the slip prevention member 9*d* comes into contact with the surface of the turntable 5 under its own weight, whereupon the rotor 9*a* spins by means of the frictional force developing between the slip prevention member 9*d* and the turntable 5.

As mentioned above, the rotational direction and rotational speed of the turntable 5 and those of the jog dial 100 can be detected by means of the rotary encoder 9*b* equipped with the photo interrupter 9*h*. Even in the case of an identical rotational operation, the pulse signal output from the sensor 101 and that output from the sensor 6 differ from each other for reasons of a difference between the size of the jog dial 100 and that of the turntable 5; more specifically, a change in the circumferential length and linear velocity of the rotor 9*a* from one mount location to another. For example, when the jog dial 100 has been turned once, the sensor 101 is presumed to output 150 pulses. When the turntable 5 has been rotated once, the sensor 6 is presumed to output 2048 pulses. Provided that the constant rotational speed of the jog dial 100 and that of the turntable 5 are 1.8 seconds/turn (33 rpm), the number of pulses output with regard to the jog dial 100 at constant speed is 83/second and the number of pulses output with regard to the turntable 5 at constant speed is 1137/second. A pulse cycle achieved at this time in connection with the jog dial 100 is 12 ms, and a pulse cycle achieved at this time in connection with the turntable 5 is 0.88 ms. The pulse cycles achieved at respective speeds are as follows:

<Constant speed>12 ms (jog dial), 0.88 ms (turntable)
<Double speed>6.0 ms (jog dial), 0.44 ms (turntable)
<Quadruple speed>3.0 ms (jog dial), 0.22 ms (turntable)
<7×speed>1.7 ms (jog dial), 0.125 ms (turntable)
<½×speed>24.0 ms (jog dial), 1.76 ms (turntable)
<¼×speed>48.2 ms (jog dial), 3.52 ms (turntable)

Reading of data from the memory 46 in the DSP signal processing section 44 is performed in the following manner. Specifically, under the assumption that the extent over which the address of the memory 46 has shifted at constant speed is taken as 44100 steps/second, when the jog dial 100 is rotationally actuated at constant speed, the extent to which the address shifts per pulse assumes a value of 44100/83=529 steps. When the turn table 5 is rotationally actuated at constant speed, the extent to which the address shifts per pulse assumes a value of 44100/1137=38.8 steps. In the case of constant speed, the DSP signal processing section 44 shifts the address by one step at 44100/second, thereby reading audio data. In the case of double speed, the speed at which the address is specified is changed to double speed, thereby reading audio data.

Figure 5A:
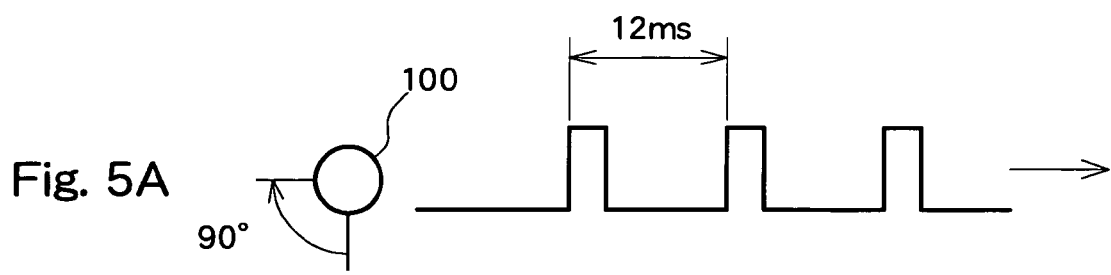
FIG. 5A is a descriptive view of a pulse signal output from a jog dial.
Figure 5B:
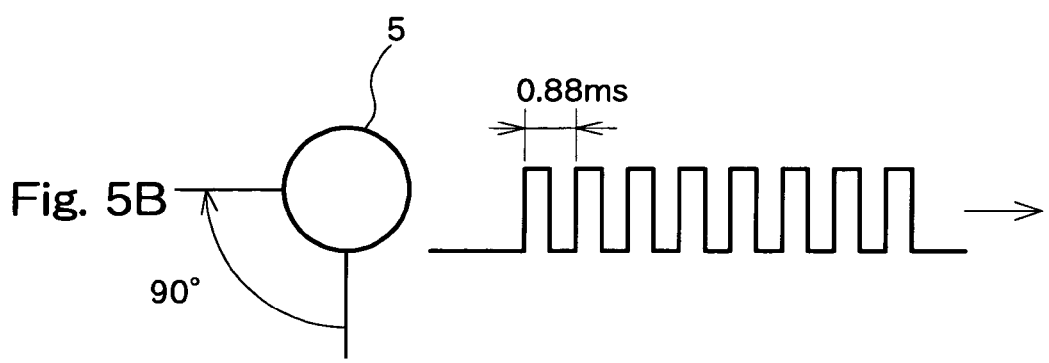
FIG. 5B is a descriptive view of a pulse signal output from the turntable.

FIG. 5A shows a pulse signal output from the jog dial 100 when the jog dial 100 has been rotationally actuated through 90° at constant speed. FIG. 5B shows a pulse signal output from the turntable 5 when the turntable 5 has been rotated through 90° at constant speed. Even when the same rotational operation has been performed, the pulse signal output from the turntable 5 has a greater number of pulses and a shorter pulse cycle as compared with the pulse signal output from the jog dial 100.

As mentioned above, a difference exists between the jog dial 100 and the turntable 5 in terms of the extent to which the address is shifted per pulse and the pulse cycle. Therefore, for instance, in a case where the main system controller 36 determines that a 90° rotation has been made at 37.5 pulses and constant speed has been achieved at a pulse cycle of 12 ms while taking the scratching operation of the jog dial 100 as a reference, thereby reading audio data from the memory 46, even when a pulse signal is supplied from the turntable 5 and the pulse signal comprises 512 pulses whose interval is 0.88 ms, the main system controller 36 does not interpret that the turntable 5 has been rotated through 90° at constant speed but instructs the DSP signal processing section 44 after having interpreted that a different rotational operation has been performed.

For this reason, the main system controller 36 instructs the DSP signal processing section 44 by means of correctly interpreting the supplied pulse signal, in accordance with the switching signal output from the sub system controller 106. Specifically, when the switching signal supplied from the sub system controller 106 indicates actuation of the jog dial 100, the pulse signal is interpreted as having been supplied with respect to 150 pulses per turn and a pulse cycle of 12 ms being achieved at constant speed. When the switching signal supplied from the sub system controller 106 indicates actuation of the turntable 5, the pulse signal is interpreted as having been supplied with respect to 2048 pulses per turn and a pulse cycle of 0.88 ms being achieved at constant speed. As a result, when the jog dial 100 and the turntable 5 are subjected to scratching operation in the same rotational direction through the same angle and at the same rotational speed, the DSP signal processing section 44 reads audio data of the same amount from the memory 46 at the same reading speed, thereby outputting the same scratching sound.

Figure 6:
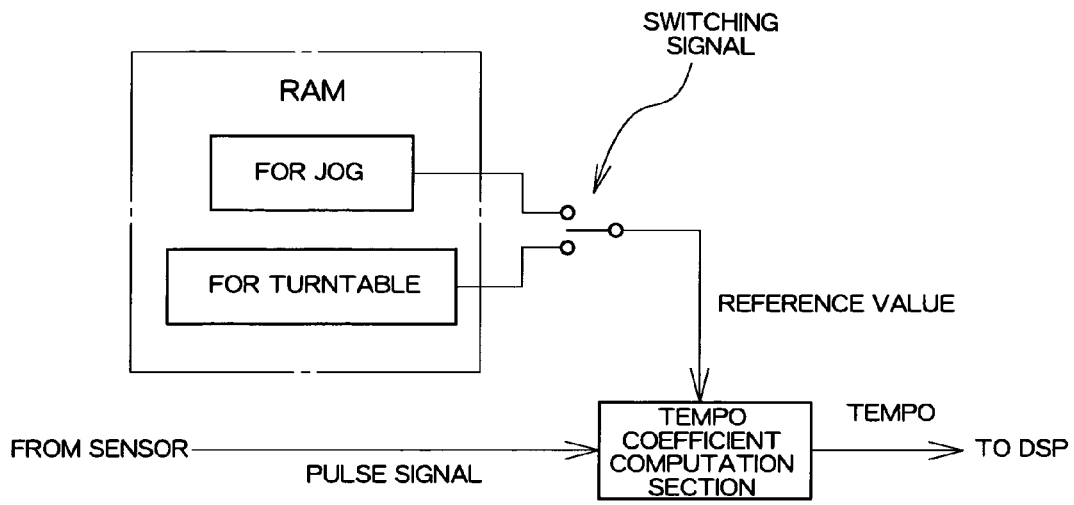
FIG. 6 is a functional block diagram pertaining to tempo setting in a main system controller.

FIG. 6 shows a functional block diagram of the main system controller 36. Reference values for the jog dial 100 and those for the turntable 5 are stored in built-in memory (RAM) of the main system controller 36. The number of pulses per turn (360°) and a pulse cycle achieved at constant speed are stored as reference values. The switching signal output from the sub system controller 106 is supplied to a switch SW, and either the reference values for the jog dial 100 or those for the turntable 5 are supplied to a tempo coefficient computation section in accordance with the switching signal. At the time of actuation of the jog dial 100, the reference values for the jog dial 100 are supplied from the memory to the tempo coefficient computation section. When the turntable 5 is actuated, reference values for the turntable are supplied from the memory to the tempo coefficient computation section. The pulse signal output from the sensor 101 of the jog dial 100 or the pulse signal output from the sensor 6 of the turntable 5 is input to the tempo coefficient computation section. On the basis of the reference values output from the memory, the tempo coefficient is computed, and a result of computation is supplied to the DSP signal processing section 44. For example, the tempo coefficient assumes a value of one at constant speed and a value of two at double speed. When the reference values for the jog dial 100 are supplied to the tempo coefficient computation section in accordance with the switching signal and when the pulse signal output from the sensor has 37.5 pulses and a pulse cycle of 6.0 ms, the thus-supplied reference values are compared with the reference values including a pulse cycle of 12 ms achieved at constant speed, the tempo coefficient is computed as two; that is, double speed, and the result of computation is supplied to the DSP signal processing section 44.

FIG. 6 is a view intended only for describing the function of the main system controller 36. In reality, the switch SW or the like, which is switched in accordance with the switching signal, is not required. A processor of the main system controller 36 reads corresponding reference values from the memory in accordance with the switching signal, thereby processing the pulse signal and determining the amount of data to be read and the tempo of scratch sound.

In the embodiment, the same scratching sound is output when the same rotational operation has been performed, by means of storing, in memory, the reference values for the jog dial 100 and those for the turntable 5; selecting the reference values in accordance with the switching signal of the jog dial 100 and the switching signal of the turntable 5; and setting the amount of audio data to be read from the memory and a read speed by means of processing the pulse signal output from the sensor in accordance with the selected reference values. One rotational operation may be taken as a reference, and a pulse signal stemming from the other rotational operation may be converted so as to match the reference. For instance, the pulse signal output from the turntable 5 is taken as a reference, and the pulse signal output from the jog dial 100 is converted into a signal at the time of actuation of the jog dial 100, whereby the thus-converted signal is interpreted by the main system controller 36. As mentioned previously, the jog dial 100 corresponds to 150 pulses per turn, and the turntable 5 corresponds to 2048 pulses per turn. At the time of constant speed, the jog dial 100 involves a pulse cycle of 12 ms, and the turntable 5 involves a pulse cycle of 0.88 ms. Accordingly, when the main system controller 36 is supplied with a pulse signal from the jog dial 100, the number of pulses is multiplied by a factor of 13.65 (=2048/150), and the pulse cycle is multiplied by a factor of 0.073 (=0.88/12), whereby the pulse signal is matched with the pulse signal supplied from the turntable 5. Thus, the amount to which and the rate at which the DSP signal processing section 44 reads data are determined. As a matter of course, the pulse signal output from the turntable 5 may be converted while the pulse signal output from the jog dial 100 is taken as a reference, thereby bringing the pulse signal in conformance with that output from the jog dial 100. As a result, when the jog dial 100 and the turntable 5 are rotationally actuated, the same scratching sound can be output.

In the embodiment, the scratching sound can be output by means of scratching the turntable 5. However, the turntable 5 is rotationally driven at constant speed (33 rpm) in a state in which no scratching operation is performed. Although the rotational driving of the turntable 5 is controlled so as to maintain constant speed at all times by means of servo control, errors may be present, or the sensor 6 may undergo rotational errors. These errors may induce fluctuations in the cycle of the pulse signal supplied from the turntable 5 to the main system controller 36. The main system controller 36 sets a tempo on the basis of the cycle of the pulse signal. Therefore, occurrence of variations in tempo, which would otherwise be caused by the fluctuations in the cycle of the pulse signal attributable to control errors arising at the time of constant-speed driving, is not desirable.

The main system controller 36 monitors variations in the cycle of the pulse signal output from the turntable 5; that is, jitter. When the jitter is equal to or less than a predetermined allowable threshold value, the turntable 5 is preferably determined not to have been subjected to scratching operation even when variations exist in the cycle of the pulse signal, thereby maintaining the tempo.

Figure 7:
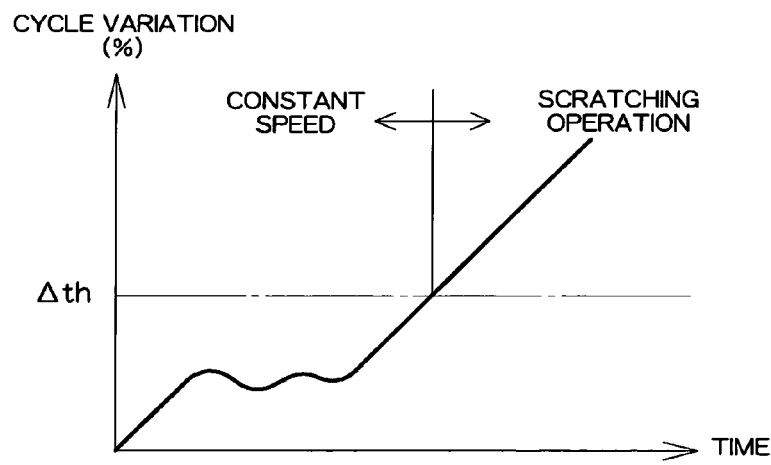
FIG. 7 is a graph showing a relationship between a jitter of the pulse signal output from the turntable and scratching operation.

FIG. 7 shows tempo coefficient setting processing to be performed by the main system controller 36. In the drawing, the horizontal axis shows time, and the vertical axis shows variations (jitter) in the cycle of the pulse signal. When the jitter is equal to or less than the predetermined threshold value $\Delta th$ (e.g. 0.2%), the tempo coefficient is deemed to be uniformly 0%; that is, constant speed, and the audio data are read from the memory 46 at constant speed. In contrast, when the jitter has exceeded the threshold value $\Delta th$, the turntable 5 is determined to have been scratched, and the audio data are read from the memory 46 at the tempo corresponding to the cycle of the pulse signal, thereby outputting scratching sound. The threshold value $\Delta th$ shown in FIG. 7 can be stored in the flash ROM 40 of the main system controller 36 beforehand. The user may set the threshold value $\Delta th$ by way of the operation display section 102 and store the thus-set threshold value in the built-in RAM of the main system controller 36. The threshold value $\Delta th$ may also act as the boundary of so-called "play" required at the time of scratching operation.

When scratching reproduction is performed in accordance with the pulse signal output from the turntable 5, the pulse signal may change depending on the positioning accuracy of the sensor 6; more specifically, the positioning accuracy of the rotor 9a. For this reason, the main system controller 36 preferably performs calibrating operation, by means of ascertaining the pulse signal output from the sensor 6; comparing the number of pulses achieved per turn and the pulse cycle achieved at constant-speed driving with the reference values; and resetting the reference values of the main system controller 36 to the actual number of pulses and pulse cycle output from the sensor 6. Calibration is preferably performed while the user's actuation of the operation display section 15 is taken as a trigger. Calibration may be automatically performed at all times upon startup of the system.

In the present embodiment, the number of pulses per turn and the pulse cycle achieved at constant speed, both pertaining to the jog dial 100, and the number of pulses per turn and the pulse cycle achieved at constant speed, both pertaining to the turntable 5, are stored as reference values in the built-in memory of the main system controller 36. However, for example, the number of pulses per 90° or the number of pulses per arbitrary rotational angle may also be adopted as the reference value of pulses. The same also applies to the pulse cycle, and, for example, the pulse cycle achieved at double speed may be adopted as a reference. When one of the pulse signals is taken as a reference and the other pulse signal is converted with the reference, a conversion constant should be stored in the built-in memory of the main system controller 36. Alternatively, in the present embodiment, the reference values are set such that the same scratching sound is output when the jog dial and the turntable are subjected to the same rotational actuation. However, when an actual operator performs scratching operation, the jog dial is smaller in radius than the turntable. For this reason, even when the operator intends to have performed the same rotational operation, the rotational angle of the jog dial is considered to become slightly excessive when compared with a case where the turntable is rotated. Therefore, in contrast with the reference values which are computational values intended for rendering the motion of the jog dial identical with that of the turntable, the reference values may include correction values that take into consideration the ratio of the radius of the turntable to that of the jog dial.

In the embodiment, the jog dial 100 and the turntable 5, which are provided in the controller 2, have been exemplified as scratching operation means. However, the present invention is not limited to these means and may be applied to operation means of arbitrary form. Alternatively, three or more scratching operation means may be present. For instance, the present invention can also be applied to a case where two of the turntables 5 are present.

The changeover switch 102*a* to be used for switching the scratching operation to the turntable 5 does not have to be disposed at the controller 2, but may be disposed at the CD player 1, the sensor 6, or another location.

What is claimed is:

1. An audio signal reproducing apparatus, comprising:
   scratching operation means;
   rotational speed detection means which detects at least a rotational speed of said scratching operation means and outputs said detected rotational speed as a rotational speed signal; and
   processing means for reproducing audio data, which have already been read from an audio signal recording medium and stored, in accordance with said rotational speed signal, wherein
   said scratching operation means comprises:
   first operation means;
   second operation means differing from said first operation means, wherein a rotational speed signal from said first operation means and a rotational speed signal from the second operation means which is achieved at the same detected rotational speed, differ from each other; and
   detection means for detecting which of the first and second operation means has been actuated, wherein
   said processing means reproduces said audio data, in accordance with said rotational speed signal output from said rotational speed detection means through use of a reference rotational speed signal assigned to one of the first and second operation means which is detected by said detection means from among a predetermined rotational speed signal of said first operation means and a predetermined rotational speed signal of said second operation means, both predetermined rotational speed signals having been achieved at a reference rotational speed.

2. The apparatus defined in claim 1, wherein said first and second operation means have disk-shaped operation surfaces, the operation surfaces differing in radius from each other.

3. The apparatus defined in claim 1, wherein said first operation means is a jog dial; and
   said second operation means is a turntable.

4. The apparatus defined in claim 1, wherein said rotational speed signal is a pulse signal having a cycle corresponding to a rotational speed; and
   said processing means comprises
      storage means which stores reference cycle data pertaining to a rotational speed signal output from said first operation means and reference cycle data pertaining to a rotational speed signal of the second operation means when said reference rotational speed is constant double speed, wherein
   said processing means reproduces said audio signal data at a reproduction speed corresponding to the cycle of said rotational speed signal output from said scratching operation means while taking, as a reference, said reference cycle data that pertain to said first operation means and have been stored in said storage means when said first operation means has been actuated or said reference cycle data that pertain to said second operation means and have been stored in said storage means when said second operation means has been actuated.

5. The apparatus according to claim 1, further comprising:
   rotational angle detection means which detects a rotational angle of said scratching operation means and outputs said rotational angle as a rotational angle signal, wherein
   said rotational angle signal is a pulse signal having the number of pulses corresponding to said rotational angle; wherein
   said processing means comprises
      storage means for storing reference cycle data pertaining to said rotational speed signal of said first operation means and reference pulse count data pertaining to said rotational angle signal of said first operation means and reference cycle data pertaining to said rotational speed signal of said second operation means and reference pulse count data pertaining to said rotational angle signal of said second operation means, when said reference rotational speed is constant double speed and at a predetermined rotational angle; and wherein
   said processing means reproduces said audio signal data in accordance with the cycle of said rotational speed signal output from said scratching operation means and the number of pulses of said rotational angle signal output from said scratching operation means while taking as references said reference cycle data and said reference pulse count data, which have been stored in said storage means at the time of actuation of the first operating means and pertain to said first operation means, or said reference cycle data and said reference pulse count data which have been stored in said storage means at the time of actuation of the second operating means and pertain to said second operation means.

6. The apparatus defined in claim 5, wherein said predetermined angle is 360°.

7. The apparatus defined in claim 3, further comprising:
   variation detection means for detecting the amount of chronological variations in said rotational speed signal output from said turntable, wherein
   said processing means reproduces said audio signal while assuming that said turntable is rotating at said reference rotational speed, regardless of said rotational speed signal output from said turntable when said chronological variation is equal to or less than an allowable level and reproduces said audio signal data at a reproduction speed corresponding to the cycle of said rotational speed signal when said chronological variations exceed said allowable level.

8. The apparatus defined in claim 7, means for changing said allowable level, wherein said allowable level is stored in RAM of said processing means.

9. The apparatus defined in claim 5, further comprising:
   means for calibrating said reference cycle data and said reference pulse count data, both being stored in said storage means, on the basis of a pulse cycle and the number of pulses which are obtained when said rotational speed of said scratching operation means detected by said rotational speed detection means and said rotational angle detection means is constant double speed and when said rotational angle of said scratching operation means is 360°.

10. An audio signal reproduction apparatus, comprising:
rotational operation means; and
processing means which reproduces an audio signal recorded on an optical disk in accordance with at least a rotational signal representing an operation speed of said rotational operation means and which outputs said audio signal as scratch sound, wherein
said rotational operation means includes first and second rotational operation means; and
said processing means has conversion means for converting at least either a rotational signal output from said first rotational operation means or a rotational signal output from said second rotational operation means such that an identical rotational signal is achieved when said first and second rotational operation means are rotated at the same rotational speed,
wherein
said rotational signal is a pulse signal having a cycle corresponding to said operation speed; and
said conversion means converts the rotational signal through use of a ratio of the cycle of said rotational signal of said first operation means achieved at said reference rotational speed to the cycle of said rotational signal of said second operation means achieved at said reference rotational speed.

11. An audio signal reproduction apparatus, comprising:
rotational operation means; and
processing means which reproduces an audio signal recorded on an optical disk in accordance with at least a rotational signal representing an operation speed of said rotational operation means and which outputs said audio signal as scratch sound, wherein
said rotational operation means includes first and second rotational operation means; and
said processing means has conversion means for converting at least either a rotational signal output from said first rotational operation means or a rotational signal output from said second rotational operation means such that an identical rotational signal is achieved when said first and second rotational operation means are rotated at the same rotational speed,
wherein
said rotational signal is a pulse signal having a cycle corresponding to said operation speed; and
said conversion means converts the rotational signal by means of multiplying the cycle of said rotational signal of said first rotational operation means by a ratio of the cycle of said rotational signal of said first operation means achieved at said reference rotational speed to the cycle of said rotational signal of said second operation means achieved at said reference rotational speed.

12. An audio signal reproduction apparatus, comprising:
rotational operation means; and
processing means which reproduces an audio signal recorded on an optical disk in accordance with at least a rotational signal representing an operation speed of said rotational operation means and which outputs said audio signal as scratch sound, wherein
said rotational operation means includes first and second rotational operation means; and
said processing means has conversion means for converting at least either a rotational signal output from said first rotational operation means or a rotational signal output from said second rotational operation means such that an identical rotational signal is achieved when said first and second rotational operation means are rotated at the same rotational speed,
wherein
said rotational signal is a pulse signal having a cycle corresponding to said operation speed and the number of pulses corresponding to an operation angle; and
said conversion means converts the rotational signal by means of multiplying the cycle and number of pulses of said rotational signal of said first rotational operation means by a ratio, of the cycle and number of pulses of said rotational signal of said first operation means to the cycle and number of pulses of said rotational signal of said second operation means achieved at said reference rotational speed and said reference rotational angle.

13. An audio signal reproduction apparatus, comprising:
rotational operation means; and
processing means which reproduces an audio signal recorded on an optical disk in accordance with at least a rotational signal representing an operation speed of said rotational operation means and which outputs said audio signal as scratch sound, wherein
said rotational operation means includes first and second rotational operation means; and
said processing means has conversion means for converting at least either a rotational signal output from said first rotational operation means or a rotational signal output from said second rotational operation means such that an identical rotational signal is achieved when said first and second rotational operation means are rotated at the same rotational speed.
wherein one of the first and second rotational operation means is a jog dial, and the other operation means is a turntable.

14. The apparatus according to claim 13, further comprising:
jitter detection means for detecting jitter of a rotational signal output from said turntable, wherein
said processing means does not output said scratch sound and reproduces said audio signal at constant double speed when said jitter is equal to or less than a predetermined allowable value.

* * * * *